2,960,500
PROCESS FOR THE EXTRACTION AND PURIFICATION OF SAPOGENINS

Thomas Eric Holt, Bushey Heath, and William Sabel, Harrow, England, assignors to Glaxo Laboratories Limited, Greenford, England, a British company No Drawing. Filed Nov. 30, 1956, Ser. No. 625,247

Claims priority, application Great Britain Dec. 7, 1955

11 Claims. (Cl. 260—239.55)

This invention is concerned with improvement in or relating to the extraction and purification of sapogenins.

Sapogenins are steroidal materials of economic importance in the manufacture of various steroids and are obtained by hydrolysis of naturally-occurring saponins which are present in the sap of many plants. In particular the sapogenin hecogenin which may be obtained for example from sisal has been proposed as a starting material for the synthesis of cortisone and related steroids having adreno-cortical activity. The production of sapogenins in bulk and in a pure or substantially pure form is therefore of considerable importance.

The extraction and purification of sapogenins is not a relatively easy matter. The naturally occurring saponins from which the sapogenins are obtained, are glycosides and, as obtained from natural sources, they are usually contaminated with waxes, other steroidal matter and various coloured impurities.

In the extraction and purification of sapogenins, the glycosidic linkages of the saponins must be hydrolysed. Thus for example in one method of carrying out this hydrolysis the sap obtained by expression of a suitable plant material (for example sisal, in the case of hecogenin), is allowed to stand for several days during which time it undergoes autolysis, and a sludge is deposited. At the end of this period the supernatant liquid is decanted and discarded. The residual sludge is then heated with acid such as sulphuric or hydrochloric, in one or more stages, to complete the hydrolysis of the glycosidic linkages. This treatment may conveniently be carried out in the country where the sisal plant or other suitable plant material is grown. So that the acid-treated material may be in a suitable condition for transportation, the acid must be removed by filtration followed either by extensive washing or by simple neutralisation with a base such as sodium carbonate. After removal of the acid the product is dried to yield what we will hereinafter refer to as a "dried sludge," which, if derived from sisal, usually contains 5–30% of hecogenin dependent on the source of sisal. The dried sludge is then further purified; thus, for example, in one method dried sludge derived from sisal is mixed with charcoal and extracted with boiling methanol. The methanolic extract is separated from the undissolved sludge and charcoal by filtration, evaporated to a smaller volume and cooled whereupon crude hecogenin crystallises out and is separated by filtration, suitably washed and dried. The crude crystalline hecogenin may then be further purified and treated, for example as described in copending applications Ser. Nos. 524,269, now abandoned, and 565,549, now Patent No. 2,827,456.

It is an object of the present invention to provide a novel method of treating the sapogenin-containing material obtained by the hydrolysis of saponins and particularly such material as is obtained by acid hydrolysis preceded if desired by enzymatic hydrolysis e.g. autolysis, to effect substantial purification and without undue loss in yield; in particular it is an object of the invention to effect substantial removal of coloured impurities from the above-mentioned dried sludge by a method which is more economical and more effective than charcoal decolourisation.

Our invention is based upon the observation that if one heats the crude sapogenin-containing material derived from the hydrolysis of saponin-containing material, with alkali, a substantial proportion of the impurities present are apparently converted into substances which can be precipitated with alkaline earth metal, e.g. calcium, ions. According to our invention however, instead of effecting the alkaline hydrolysis in aqueous solution, it is performed in a lower alkanol solution in which the hecogenin is soluble; we then add alkaline earth metal ions which precipitate coloured impurities which can be filtered off. By the use of a lower alkanol in the hydrolysis and treatment with calcium ions procedure, we achieve greater purification and the operation is easier to carry out than if aqueous media are used, Thus, hecogenin is not soluble in aqueous media and if such media are used, the hecogenin is filtered off with the impurities from which it has subsequently to be separated.

According to the present invention there is provided a process for the purification of a crude sapogenin-containing material obtained by the hydrolysis of natural saponin-containing material and containing coloured impurities which comprises heating the crude sapogenin-containing material with a solution of an alkali metal hydroxide, or an alkali metal alkoxide of an alkanol containing 1–5 carbon atoms, in an alkanol containing 1–5 carbon atoms to effect at least partial hydrolysis of coloured impurities, treating the reaction mixture with alkaline earth metal ions to precipitate at least some of the coloured impurities and separating the alkanolic solution containing dissolved sapogenin.

According to a feature of the invention the crude sapogenin-containing material is one obtained by acid hydrolysis, preceded if desired by enzymatic hydrolysis, e.g. autolysis, of natural saponin-containing material.

The alkanolic solution obtained according to the process of this invention contains the desired sapogenin which, whilst still crude, has had a substantial amount of its natural contaminants removed. On crystallisation from the alkanol a product of good crystalline form is obtained which may be readily filtered and subjected to further purification e.g. extraction with a liquid hydrocarbon solvent consisting predominantly of aliphatic hydrocarbons containing 6–12 carbon atoms and treatment e.g. acetylation.

It will be apparent that our process may be conveniently carried out on acid-free "dried sludge" or material derived directly from the acid hydrolysis and still containing unneutralised acid. In the latter case it will of course be necessary to add further caustic alkali, or some other base, to react with the residual acid. The process according to the invention is best effected upon dried sludge or material derived directly from the said hydrolysis; if desired of course other purification procedures can be interposed.

A preferred alkanol is methanol although other alkanols such as ethanol, propanol and isopropanol may be used.

Suitable alkali metal hydroxides are for example sodium and potassium hydroxides, and suitable alkali metal alkoxides are those formed from the alkanol being used e.g. sodium and potassium methoxide. The quantity of alkali or alkoxide required will vary from batch to batch of the "dried sludge" depending on its origin. In general it has been found that 20% by weight (calculated on "dried sludge") of sodium hydroxide or an equivalent amount of other alkali or alkoxide is satisfactory. The hydrolysis is preferably carried out by boiling the starting material in the alkanolic solution of alkali or alkoxide for at least one hour.

The treatment with alkaline earth metal ions is preferably conducted with calcium ions. Thus for example we may add to the reaction mixture after treatment with the alkali, a calcium salt, soluble in the alkanol used, e.g. calcium chloride or calcium acetate. We prefer to use the alkaline earth metal salt in an amount substantially stoichiometrically equal to the amount of hydroxide or alkoxide used.

In order that the invention may be better understood it will now be described with reference to the following examples. In these examples the "dried sludge" was prepared after the following manner:

The waste juice arising from the decortication of sisal leaves, after straining, was allowed to stand at a temperature of about 30° C. for 7 days. During this time enzymatic fermentation took place with the deposition of solid material. The clear supernatant liquid 80% by volume was decanted and the remaining slurry treated with sulphuric acid so that the final concentration was 1N. This mixture was boiled for 4 hours, cooled and the supernatant again decanted (about 50% by volume of the acidified slurry). The residue was made 3N with respect to sulphuric acid and the mixture boiled for 4 hours. The hecogenin-containing solid present in this acid mixture was filtered off on a filter press and washed for 2 hours with water. The solid was removed from the press and treated with an aqueous solution of sodium carbonate until the final liquors were at a pH of about 7. The neutralised slurry was again filtered on the press and washed with water for 2 hours. The cake was spread on to trays and dried at 80° C. for a total of 48 hours. The dried material is known as "dried sludge."

*Example 1*

Hecogenin-containing "dried sludge" (50 g.) of Kenyan origin was refluxed and stirred with methanol (500 ml.) and commercial sodium hydroxide (10 g.) for one hour. Anhydrous calcium chloride (13.9 g.) was added and stirring continued for fifteen minutes. The mixture was hot filtered and the filter cake washed with hot methanol (200 ml.). The combined filtrate and wash, light green in colour at this stage, were concentrated to 200 ml. and again hot filtered to remove crystallised sodium chloride, the filter-cake being washed with hot methanol (20 ml.). The combined filtrate and wash were allowed to cool, crude hecogenin separating in fans of flat needles. The crystalline crude hecogenin was harvested by filtration and a second crop obtained by concentration of the filtrate to 50 ml. The two crops of crude hecogenin were combined, slurried with light petroleum (50 ml. S.B.P. 3) and filtered, the filter cake being rinsed with light petroleum (10 ml.). The filter cake was dried at 100° C. yielding pale green crude hecogenin (9.98 g.).

*Example 2*

Hecogenin-containing "dried sludge" (30 g.) of Kenyan origin was refluxed and stirred with sodium hydroxide (10 g.) and methanol (500 ml.) for one hour. Calcium acetate (20 g.) was added and stirring continued for fifteen minutes. The mixture was hot filtered and the crude hecogenin separated in manner described in Example 1 above. A yield of 9.71 g. of pale green crude hecogenin was obtained.

*Example 3*

Hecogenin-containing "dried sludge" (50 g.) of Tanganyikan origin was refluxed and stirred with methanol (500 ml.) and sodium hydroxide (10 g.) for one hour. Calcium chloride (15 g.) dissolved in methanol (200 ml.) was added, the mixture stirred for fifteen minutes and hot filtered. The filter cake was washed with methanol (200 ml.) and the crude hecogenin isolated as in Example 1 above. A yield of 9.0 g. of light buff crude hecogenin was obtained.

*Example 4*

Hecogenin-containing "dried sludge" (50 g.) of Jamaican origin, was refluxed and stirred with methanol (500 ml.) and commercial sodium hydroxide (10 g.) for one hour. Commercial calcium chloride (20.5 g.) was added and stirring continued for fifteen minutes. The mixture was hot filtered and the filter cake washed with hot methanol (200 ml.). The combined filtrate and wash were concentrated to 300 ml. and two crops of crude hecogenin isolated as described in Example 1 above. A yield of 7.2 g. of off-white crude hecogenin was obtained.

*Example 5*

Metallic sodium (8 g.) was dissolved in methanol (500 ml.) and hecogenin-containing "dried sludge" (50 g.) of Kenyan origin was added. The mixture was refluxed and stirred for 1 hr., flake calcium chloride (30 g.) added and stirring continued for a further 10 minutes. The mixture was hot filtered and the crude hecogenin separated in the manner described in Example 1 above. A yield of 8.15 g. of pale green crude hecogenin was obtained.

*Example 6*

Hecogenin-containing "dried sludge" (50 g.) of Tanganyikan origin was refluxed and stirred with n-butanol (500 ml.) and potassium hydroxide (14 g.) for one hour. Calcium chloride (14 g.) was added and stirring continued for thirty minutes. The mixture was hot filtered and the filter cake washed with butanol (200 ml.), the mother liquors were concentrated to 200 ml. and cooled. The solid was harvested and washed with a little butanol and then slurried with light petroleum (50 ml.) and filtered. The cake was washed with petrol and dried at 100° C. yielding pale green crude hecogenin (9.3 g.).

Whilst the process according to the invention has been described with particular reference to the production of hecogenin it will be clear that it is applicable to the production of other sapogenins e.g. diosgenin.

We claim:

1. A process for the purification of a dried crude material containing a sapogenin selected from the group consisting of hecogenin and diosgenin and colored impurities, said crude material having been obtained by the hydrolysis of a plant sap containing the saponin corresponding to said sapogenin, which process comprises: heating said crude material with a substantially anhydrous solution of an alkali metal compound selected from the group consisting of an alkali metal hydroxide and an alkali metal alkoxide of an alkanol containing 1–5 carbon atoms, in an alkanol containing 1–5 carbon atoms to dissolve said sapogenin and said colored impurities and render said impurities precipitatable by calcium ions; treating the anhydrous reaction mixture with calcium ions to precipitate colored impurities; and separating the alkanoic solution containing dissolved sapogenin from said precipitated impurities.

2. A process as claimed in claim 1 in which said calcium ions are obtained by adding a calcium salt which is soluble in the alkanol used.

3. A process as claimed in claim 1 in which the hydrolysis is an acid hydrolysis.

4. A process as claimed in claim 3 in which said acid hydrolysis is preceded by enzymatic hydrolysis.

5. A process as claimed in claim 4 in which the sapogenin-containing material is a hecogenin-containing material.

6. A process as claimed in claim 5 in which hecogenin containing lesser amounts of said colored impurities is recovered from the alkanoic solution by crystallisation.

7. A process as claimed in claim 5 in which the alkanol used is methanol.

8. A process as claimed in claim 5 in which said alkali metal compound is sodium hydroxide.

9. A process as claimed in claim 5 in which said alkali metal compound is sodium methoxide.

10. A process as claimed in claim 5 in which the quantity of alkali metal compound used is approximately 20% by weight (calculated as sodium hydroxide) of the crude hecogenin-containing material on a dry basis.

11. A process as claimed in claim 5 in which the treatment with alkali metal compound is carried out by boiling the crude sapogenin-containing material in the alkanolic solution containing said compound for at least one hour.

References Cited in the file of this patent

UNITED STATES PATENTS

| 2,734,898 | Callow et al. | Feb. 14, 1956 |
| 2,798,025 | Spensley | July 2, 1957 |

FOREIGN PATENTS

| 702,072 | Great Britain | Mar. 2, 1951 |